United States Patent [19]

Kitakami et al.

[11] Patent Number: 5,068,144
[45] Date of Patent: Nov. 26, 1991

[54] PERPENDICULAR MAGNETIC RECORDING MEDIUM AND METHOD FOR PRODUCING THE SAME

[75] Inventors: Osamu Kitakami, Toride; Hideo Fujiwara, Ibaraki; Kiyotaka Ojima, Ibaraki; Youichi Ogawa, Ibaraki; Kunio Wakai, Ibaraki, all of Japan

[73] Assignee: Hitachi Maxell, Ltd., Osaka, Japan

[21] Appl. No.: 596,760

[22] Filed: Oct. 1, 1990

Related U.S. Application Data

[63] Continuation of Ser. No. 344,556, Apr. 25, 1989, abandoned, which is a continuation of Ser. No. 878,339, Jun. 25, 1986, abandoned.

[30] Foreign Application Priority Data

Jun. 25, 1985 [JP] Japan .................................. 60-136790

[51] Int. Cl.$^5$ .............................................. G11B 23/00
[52] U.S. Cl. ..................................... 428/323; 427/50; 427/128; 427/250; 428/694; 428/900
[58] Field of Search ................. 428/694, 900, 323; 427/44, 128, 132, 50, 250; 204/192.2

[56] References Cited

U.S. PATENT DOCUMENTS

| | | | |
|---|---|---|---|
| 4,260,466 | 4/1981 | Shirahata et al. | 427/132 |
| 4,428,974 | 1/1984 | Okita et al. | 427/128 |
| 4,588,656 | 5/1986 | Kitamoto et al. | 427/132 |

Primary Examiner—Paul J. Thibodeau
Attorney, Agent, or Firm—Birch, Stewart, Kolasch & Birch

[57] ABSTRACT

A perpendicular magnetic recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, wherein a volume content of the organic polymer is about 5 to 55% by volume of the whole volume of the magnetic layer, which medium has not only good recording and reproducing characteristics but also improved durability.

21 Claims, 4 Drawing Sheets

PERPENDICULAR MAGNETIC RECORDING MEDIUM AND METHOD FOR PRODUCING THE SAME

This application is a continuation of application Ser. No. 07/344,556 filed on Apr. 25, 1989, now abandoned, which was a continuation of application Ser. No. 06/878,339 filed on June 25, 1986, now abandoned.

FIELD OF THE INVENTION

The present invention relates to a perpendicular magnetic recording medium and a method for producing the same. More particularly, it relates to a perpendicular magnetic recording medium in which acicular ferromagnetic particles in the magnetic film are perpendicularly oriented to a plane of the magnetic film and a method for producing the same.

BACKGROUND OF THE INVENTION

As one of the methods for increasing the recording density of a magnetic recording medium, a perpendicular magnetic recording medium attracts attention. As the magnetic layer of a perpendicular magnetic recording medium, various ferromagnetic metal films, not only films such as a cobalt-chromium alloy thin film, but also cobalt-vanadium, cobalt-ruthenium and cobalt-oxygen films have been investigated and high density recording has been achieved. But, they still have some drawbacks.

For example, in comparison with a coating type recording medium comprising a magnetic recording layer containing a binder, the perpendicular recording magnetic media have low mechanical strength so that they are apt to be damaged by the sliding contact against a magnetic head.

When the ferromagnetic metal film is formed on a flexible non-magnetic substrate such as a polymeric film, the flexibility of the substrate is considerably deteriorated so that it becomes difficult to maintain stable contact between the magnetic head and the surface of the recording medium.

Furthermore, since the magnetic recording medium comprising a non-binder type metal film has good electrical conductivity due to the metal recording film, eddy current is generated by the sliding contact of the medium against the magnetic head, which adversely affects recording and reproducing characteristics.

For production of a conventional horizontal magnetic recording medium, Japanese Patent Publication No. 3137/1982 discloses the following method:

In this method, a magnetic recording medium is produced by means of a sputtering apparatus as shown in FIG. 1. The sputtering apparatus comprises vacuum chamber 21, in which anode 22 and cathodes 23a and 23b are installed in place and connected with a high voltage source (not shown). Vacuum chamber 21 is evacuated through vacuum outlet 24, and then supplied with an inert gas such as argon gas from needle valve 25.

To anode 22, disc form non-magnetic substrate 26 is attached with facing its surface to cathodes 23a and 23b and rotated at a predetermined rate by means of motor 27. On cathodes 23a and 23b, cobalt target 28 and polytetrafluoroethylene target 29 are placed, respectively.

After reducing the pressure of vacuum chamber 21 to high vacuum by evacuating it through outlet 24, argon gas is introduced in the chamber through needle valve 25. Then, when non-magnetic substrate 26 is rotated by motor 27, the substrate is sputtered simultaneously with cobalt and polytetrafluoroethylene from targets 28 and 29, respectively, to form a composite film of cobalt and polytetrafluoroethylene on the substrate. During sputtering, the voltage applied to each of the cathodes 23a and 23b is independently controlled.

This method, however, still has some drawbacks. That is, since substrate 26 is rotated during sputtering, only cobalt is accumulated on a part of the substrate, and that being when said part faces cobalt target 28, while only polytetrafluoroethylene is accumulated when substrate 26 is rotated and faces polytetrafluoroethylene target 29. As a result, thin layers of cobalt and polytetrafluoroethylene are alternately formed.

A structure in which the thin layers of the magnetic material and an organic polymer are alternately laminated is suitable for the production of the horizontal magnetic recording medium but not for the production of the perpendicular magnetic recording medium having satisfactory magnetic characteristics for high density recording.

IBM Technical Disclosure Bulletin, Vol. 25, No. 9, February 1983 describes a method for producing a perpendicular magnetic recording medium as follows:

Said method is illustrated by making reference to FIG. 2. Firstly, on non-magnetic substrate 31, ferromagnetic metal layer 32 with a specific thickness is formed. Then, a mask 34 having windows 33 is placed on metal layer 32 and the metal layer is perpendicularly plasma etched so that parts of the metal layer 32 corresponding to windows 33 of the mask are etched to form bores 35 (see the right half of FIG. 2). Thereafter, bores 35 are filled with, for example, polyimide resin 36 to form a magnetic layer consisting of a composite material of the ferromagnetic metal and the organic polymer (see the left half of FIG. 2).

In the above method, since bores 35 of metal layer 32 should be filled with organic polymer 36, the diameter of the bores should be made large so that the volume ratio of the organic polymer in the magnetic layer inevitably increases to about 80% by volume, whereby durability of the magnetic layer decreases. Further, due to plasma etching and organic polymer filling, the production process becomes complicated and the apparatus becomes large resulting in an increase in the production cost of the magnetic medium.

SUMMARY OF THE INVENTION

One object of the present invention is to provide a perpendicular magnetic recording medium comprising a magnetic layer in which acicular particles of ferromagnetic metal is perpendicularly oriented to the plane of the layer and surrounded by an organic polymer filled in spaces between the acicular particles.

Another object of the present invention is to provide a method for producing a perpendicular magnetic recording medium.

According to one aspect of the present invention, there is provided a perpendicular magnetic recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, wherein a volume content of the organic polymer is about 5 to 55% by volume of the whole volume of the magnetic layer.

According to another aspect of the present invention, there is provided a method for producing a perpendicular recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, which method comprises simultaneously depositing the ferromagnetic metal and the organic polymer on the surface of the substrate to form the magnetic layer.

According to a further aspect of the present invention, there is provided a method for producing a perpendicular recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, which method comprises depositing the ferromagnetic metal on the surface of the substrate simultaneously with, injecting a monomer from which the organic polymer is deposited made on the surface and radiating the monomer with electromagnetic or ionization radiation to polymerize the monomer.

DETAILED DESCRIPTION OF THE INVENTION

The ferromagnetic metal used according to the present invention includes an alloy of a transition metal (e.g. cobalt, iron and nickel) and at least one of other elements, an oxide of such metal (e.g. $\gamma$-$Fe_2O_3$ and the like) and a nitride of such metal. Preferred is a cobalt alloy comprising cobalt and at least one metal selected from the group consisting of chromium, vanadium, molybdenum, ruthenium, rhodium, tantalum, tungsten, rhenium and osmium.

Specific examples of the organic polymers are polyethylene, polyethylene terephthalate, polypropylene, polystyrene, polytetrafluoroethylene, polybutadiene, polycarbonate, polyamide, polyimide, polyvinyl chloride, polyvinyl acetate, polyurethane and the like. The polymer may be used alone or a mixture of two or more. The polymer may contain its monomer, oligomer and/or telomer therein.

Although the organic polymer can be used in the form of a high molecular weight material, it can also be produced on the surface of the substrate by injecting the monomer from which the polymer is made on the substrate, while simultaneously depositing the ferromagnetic metal on the substrate and polymerizing the monomer during or after formation of the magnetic metal layer by irradiating the monomer with electromagnetic or ionization radiation.

When ultraviolet light is used as the electromagnetic radiation, ultraviolet light with strength of at least 0.1 watt/$cm^2$ is irradiated on the surface of the layer so as to polymerize the monomer.

When the organic polymer is supplied in the form of a polymer and deposited on the substrate surface simultaneously with the deposition of the ferromagnetic metal, the deposited polymer may become depolymerized so that the durability of the magnetic layer would become deteriorated. In such case, the degraded organic polymer deposited on the substrate simultaneously with the deposition of the ferromagnetic metal can be cross linked by irradiation with an electromagnetic or ionization radiation to increase the cross linking density, whereby the mechanical strength of the magnetic layer can be increased.

According to the present invention, deposition can be carried out by ion plating, sputtering, ion beam deposition, chemical vapor deposition and the like.

The perpendicular magnetic medium of the invention may further comprise an undercoat of a soft magnetic metal (e.g. NiFe (Parmalloy)) between the substrate film and the perpendicular magnetic layer.

Practical and presently preferred embodiments of the present invention will be illustrated by the following examples.

EXAMPLE 1

Figure 1:
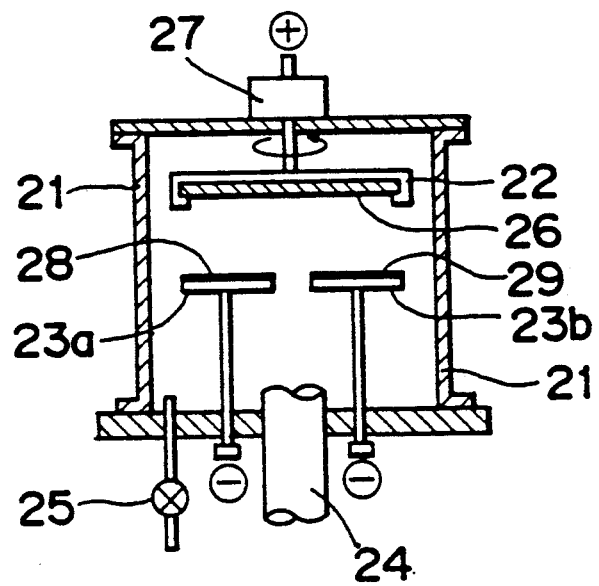
FIG. 1 is a cross section of an apparatus used in a method described in Japanese Patent Publication No. 3137/1982.
Figure 2:
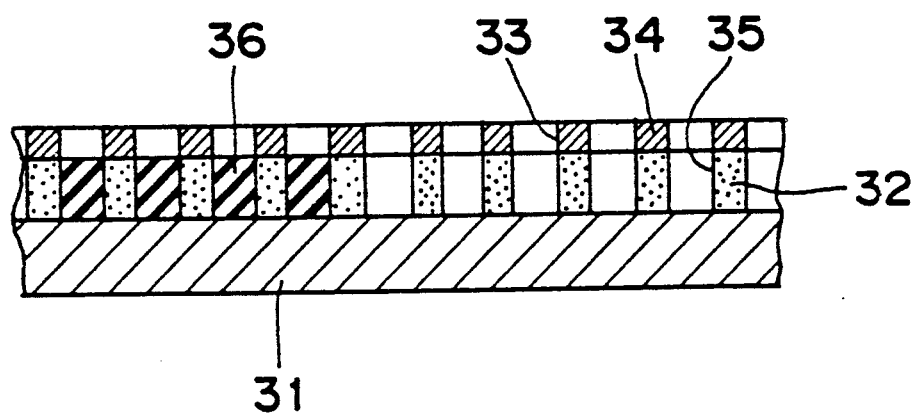
FIG. 2 is a cross section of a perpendicular recording medium produced by a method of IBM, FIGS. 3 and 6 schematically show apparatuses for producing a perpendicular magnetic recording medium of the invention.
Figure 3:
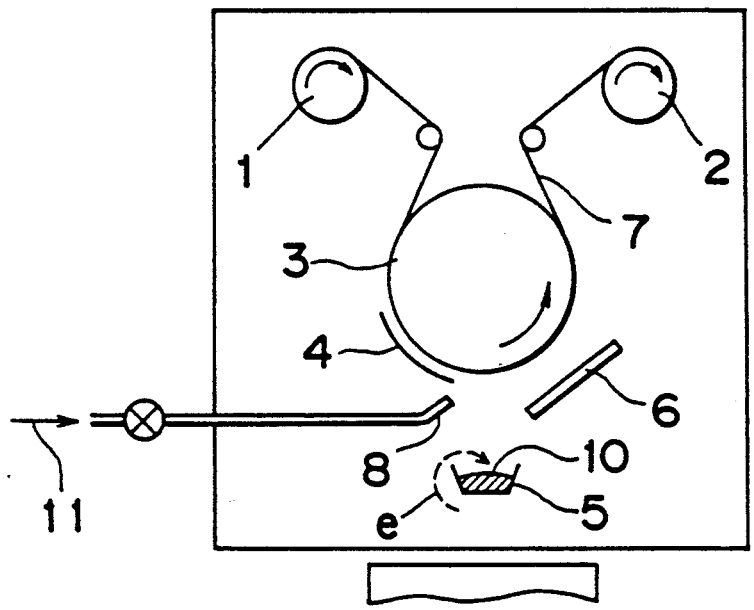

On a substrate film made of a polyimide film of 40 $\mu$m in thickness ("KAPTON", a trade name of DuPont), a composite film of a cobalt-chromium alloy and polymethyl methacrylate was formed by means of an apparatus shown in FIG. 3, wherein numeral 1 represents a feed roll, 2 represents a winding roll, 3 represents a can, 4 represent a mask, 5 represents a bath, 6 represents a UV lamp, 7 represents a substrate film, and 8 represent a nozzle.

Substrate film 7 supplied from roll 1 was heated by can 3 kept at a predetermined temperature. On the can, the magnetic layer was formed on the substrate film and then the film is wound by roll 2.

In bath 5, the cobalt-chromium alloy was contained and heated by an electron beam to evaporate it. A stream of the evaporated alloy was flowed toward the can and its flowing direction was adjusted by mask 4 so that an incident angle of the stream against substrate film 7 was 40 degrees or less from a line perpendicular to the surface of substrate film 7.

To a part of substrate film 7 where the cobalt-chromium alloy was being deposited, gaseous methyl methacrylate 11 was jetted through nozzle 8. Simultaneously, ultraviolet light was irradiated at a strength of 0.5 watt/$cm^2$ by means of lamp 6 to polymerize methyl methacrylate on the substrate film. Other conditions were as follows:

| | |
|---|---|
| Can temperature: | 80° C. |
| Film deposing rate: | 2,000 Å |

-continued

| Film thickness: | 0.7 μm |
|---|---|

The resulting composite film of the cobalt-chromium alloy and polymethyl methacrylate had such microstructure that acicular particles of the cobalt-chromium alloy grew perpendicularly to the plane of the composite film and polymethyl methacrylate filled the spaces between the particles so as to surround them. The content of polymethyl methacrylate in the composite magnetic layer was about 20% by volume.

Under the above conditions with varying the chromium content in the alloy so as to be about 6, 10, 19, 25 or 28% by weight, a perpendicular magnetic recording disc of 3 inches in diameter was produced.

Each of the produced magnetic discs was recorded at a recording density of 10 KBPI by means of a magnetic disc driving unit. Then, number of passing times through the magnetic head till reproducing output decreased to 80% of the original output was measured. All the disc showed more than 3,000,000 time passing, which means good durability.

Figure 4:
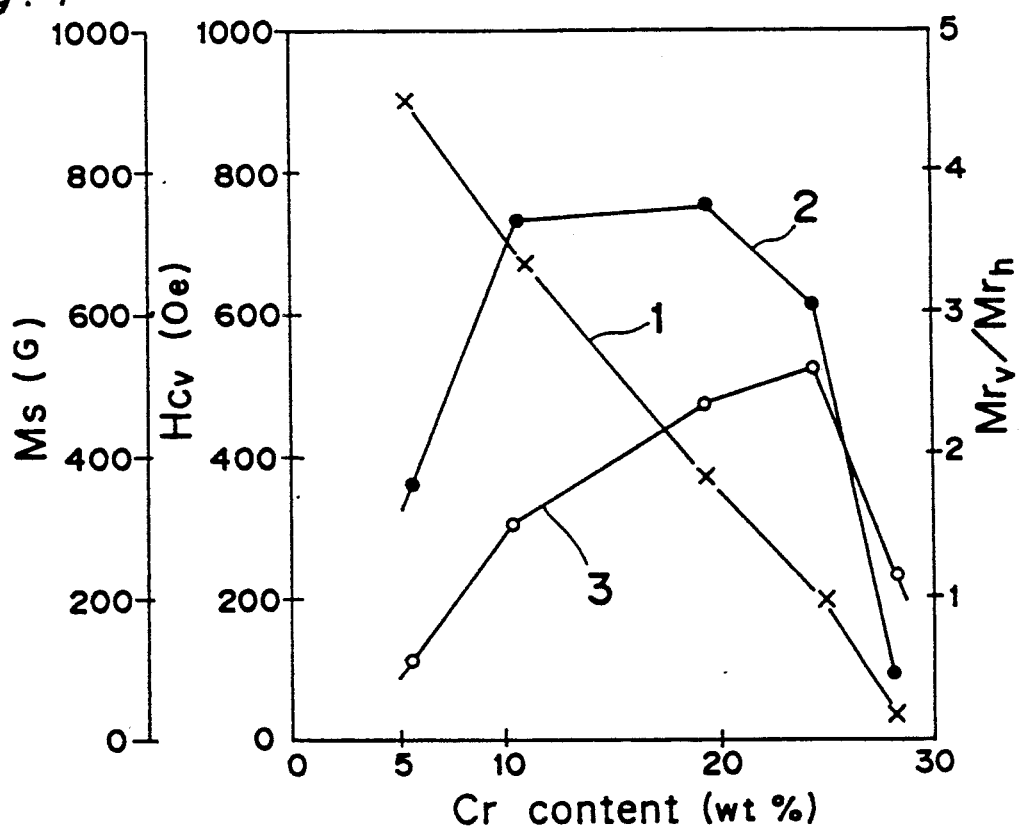
FIG. 4 is a graph showing properties of the perpendicular magnetic recording disc produced in Example 1.

A perpendicular coercive force ($Hc_v$) (Oe), saturation magnetization (Ms) (Gauss) and a ratio of perpendicular residual magnetism ($Mr_v$) and horizontal residual magnetism ($Mr_h$) ($Mr_v/Mr_h$) were measured. The results are shown in FIG. 4, in which Curve 1 represents Ms, Curve 2 represents $Hc_v$, and Curve 3 represents $Mr_v/Mr_h$. As is apparent from FIG. 4, $Hc_v$ and $Mr_v/Mr_h$ increase after the chromium content exceeds 5% by weight and $Hc_v$ is maximum around the chromium content of 10 to 20% by weight and then gradually decreases. $Mr_v/Mr_h$ gradually increases as the chromium content increases. This means increase of perpendicular orientation of the magnetic metal particles. However, it decreases after the chromium contents exceeds 25% by weight. On the contrary, Ms monotonously decreases as the chromium content increases. From these results, it can be concluded that the preferred chromium content in the cobalt-chromium alloy is 10 to 25% by weight.

EXAMPLE 2

Figure 5:
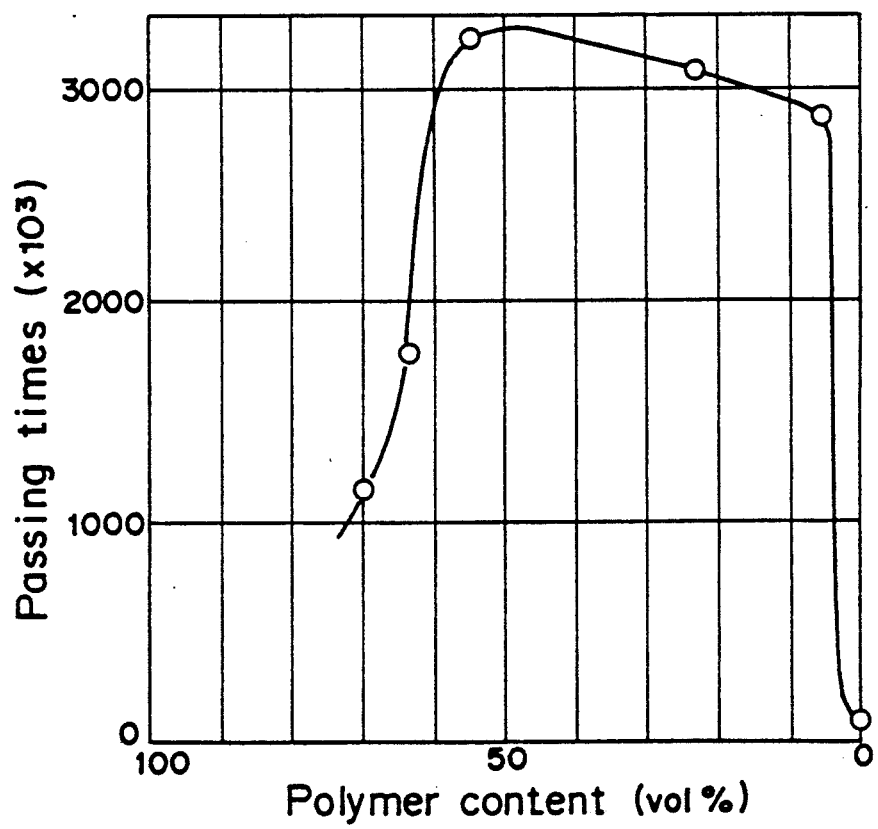
FIG. 5 is a graph showing a relationship between the polymer content in the magnetic layer and passing times of the magnetic recording medium.

In the same manner as in Example 1 but using a cobalt-chromium alloy containing 10% by weight of chromium and adjusting the conditions so that the volume content of the organic polymer was 0, 5, 23, 55, 63 and 70% by volume, a perpendicular recording disc of 3 inches in diameter was produced. The produced magnetic discs was recording at a recording density of 10 KBPI by means of a magnetic disc driving unit. Then, number of passing times through the magnetic head till reproducing output decreased to 80% of the original output was measured. The results are shown in FIG. 5.

As is clear from these results, the number of the passing times is small if the organic polymer content is smaller than 5% by volume or larger than 55% by volume. On the contrary, when the organic polymer content in the magnetic film is in a range between 5 and 55% by volume, particularly between 23 and 55% by volume, the magnetic medium has excellent durability.

Table 1 below shows magnetic characteristics and the number of passing times against the magnetic head of a perpendicular magnetic medium comprising a magnetic layer consisting of the cobalt-chromium alloy and those of Example 2 containing 55% by volume of polymethyl methacrylate (PMMA) in the magnetic layer.

TABLE 1

| Property | Co—Cr alloy alone | Co—Cr-PMMA composite |
|---|---|---|
| Ms (G) | 360 | 300 |
| $Hc_v$ (Oe) | 700 | 800 |
| $(Mr/Ms)_v$ | 0.18 | 0.25 |
| $Mr_v/Mr_h$ | 1.8 | 2.5 |
| Passing time ($\times 10^3$) | 1–10 | 3,000< |

As is apparent from these results, the perpendicular magnetic recording medium of the present invention has not only the improved perpendicular squareness ratio (Mr/Ms) and $Mr_v/Mr_h$ but also extremely improved durability.

EXAMPLE 3

Figure 6:
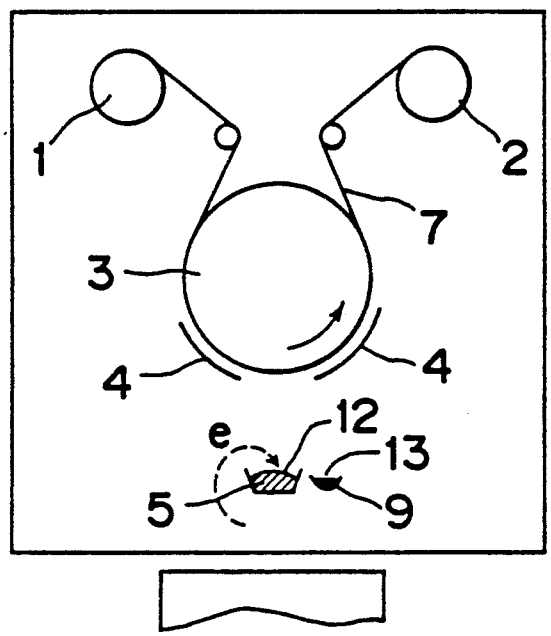

On a substrate film made of a polyethylene terephthalate film of 12 μm in thickness, a composite film of iron and polyethylene was formed by means of a vacuum deposition apparatus shown in FIG. 6, wherein the same numerals represents the same elements as in FIG. 3, and numeral 12 represents iron contained in bath 5 and 13 represents polyethylene contained in boat 9.

The deposition of iron on substrate film 7 was carried out by heating bath 5 by electron beam, and the stream of vaporized iron was controlled by masks 4 and 4 so that the incident angle of the stream against the can was within 20 degrees from the perpendicular line. Simultaneously with the deposition of iron, boat 9 containing polyethylene was heated by an electric heater (not shown) to evaporate polyethylene, which was deposited on the substrate film. Thereby, a composite film of iron and polyethylene was formed on the substrate film. The resulting composite film had such microstructure that acicular particles of iron grew perpendicularly to the plane of the composite film and polyethylene filled the spaces between the particles so as to surround them.

Other deposition conditions were substantially the same as in Example 1.

Figure 7:
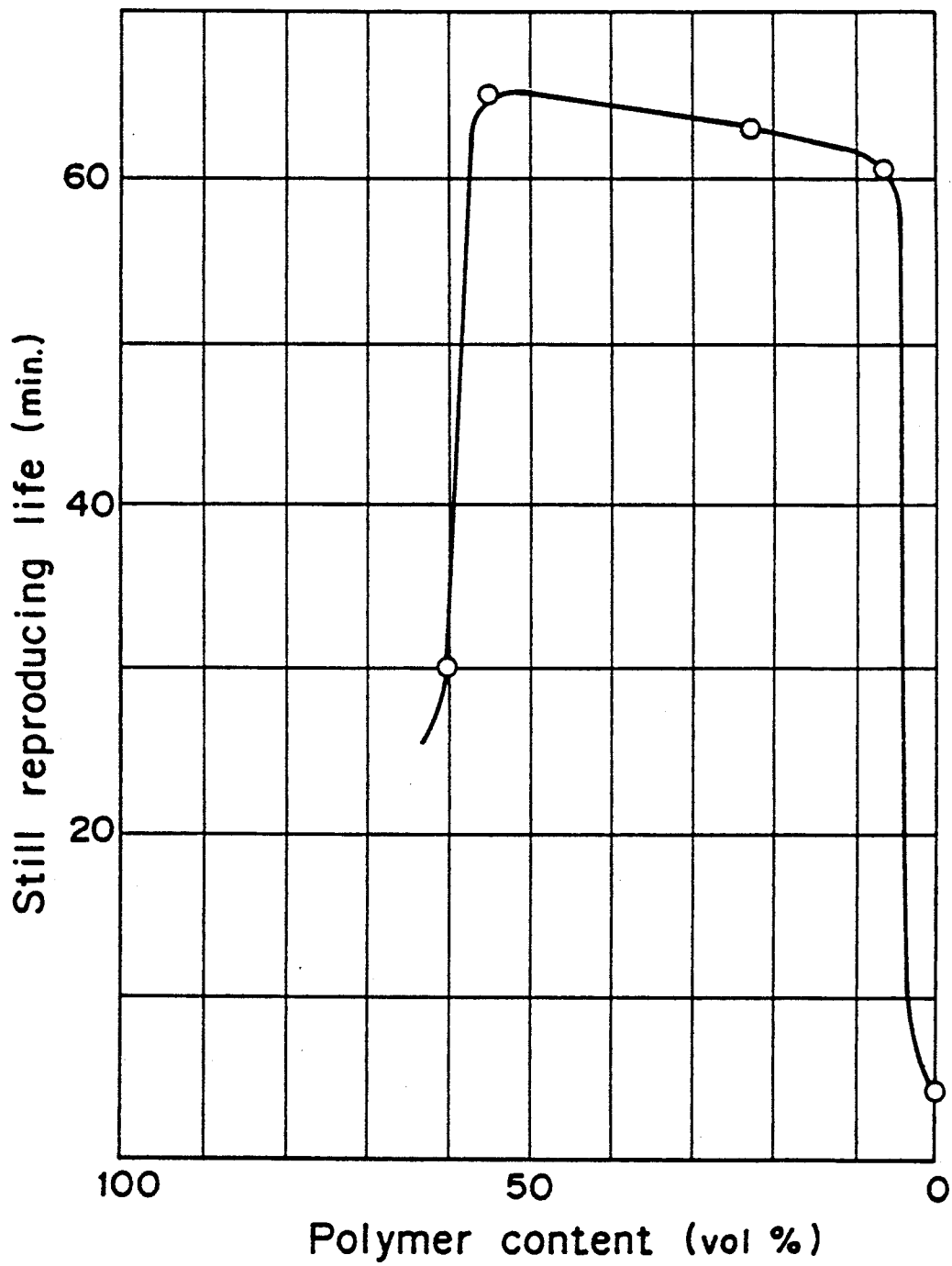
FIG. 7 is a graph showing a relationship between the polymer content in the magnetic layer and still reproducing life.

Under the above conditions, a perpendicular magnetic recording medium comprising a composite film containing 0, 5, 23, 55 or 60% by volume of polyethylene was produced. Its durability was evaluated by measuring still reproducing life. The results are shown in FIG. 7.

As is clear from these results, durability of the magnetic film is poor if the organic polymer content is smaller than 5% by volume or larger than 55% by volume. On the contrary, when the organic polymer content in the magnetic film is in a range between 5 and 55% by volume, particularly between 23 and 55% by volume, the magnetic medium has excellent durability.

Table 2 below shows magnetic characteristics and the still reproducing life of a perpendicular magnetic medium comprising a magnetic layer consisting of iron and those of Example 3 containing 55% by volume of polyethylene (PE) in the magnetic layer.

TABLE 2

| Property | Iron alone | Iron-PE composite |
|---|---|---|
| Ms (G) | 1,400 | 700 |
| $Hc_v$ (Oe) | 50 | 650 |
| $(Mr/Ms)_v$ | ca. 0 | 0.17 |
| $Mr_v/Mr_h$ | 0 | 1.5 |
| Still reproducing life (min.) | 4 | 65 |

As is apparent from these results, the perpendicular magnetic recording medium of the present invention has not only the improved perpendicular squareness ratio (Mr/Ms) and $Mr_v/Mr_h$ but also extremely improved still reproducing life.

EXAMPLE 4

The perpendicular magnetic medium produced in Example 3 in which the organic polymer content was 23% by volume was irradiated by ultraviolet light with strength of about 0.1 watt/cm² for about 5 minutes to cross link the polymer in the magnetic layer. The still reproducing life of the irradiated medium was extended to 100 minutes from 65 minutes of the non-irradiated medium.

In view of recording and reproducing characteristics of the magnetic medium, since each acicular particle of the ferromagnetic metal is isolated from others by the organic polymer, the reproducing output and high density recording characteristics are improved as the content of the organic polymer in the magnetic layer is decreased when the magnetic interaction between the acicular particles is weak. However, if the organic polymer content is less than 5% by weight, the space between the acicular particles becomes too narrow so that a so-called magnetic wall is generated, whereby reproducing output and high density recording characteristics are considerably deteriorated due to deterioration of the perpendicular magnetization characteristics.

In the perpendicular magnetic recording medium of the present invention, each of the acicular particles of the ferromagnetic metal is perpendicularly oriented to the plane of the magnetic layer and surrounded by the organic polymer which fills the spaces between the particles. Therefore, the perpendicularly oriented acicular particles of the ferromagnetic metal serves to maintain the mechanical strength of the magnetic layer when the surface of the magnetic layer is slidingly contacted with the magnetic head, while the organic polymer in the magnetic layer serves to relax the stress applied to the acicular particles by the magnetic head. When the organic polymer content in the magnetic layer is in the range between 5 and 55% by volume, the acicular particles and the organic polymer cooperate effectively so that the durability of the magnetic layer is greatly improved as understood form the results of FIGS. 5 and 7. Further, the flexibility of the magnetic medium is improved by the present invention in comparison to that comprising the magnetic layer made of the ferromagnetic metal alone, whereby the contact condition of the magnetic layer with the magnetic head is improved.

What is claimed is:

1. A perpendicular magnetic recording medium comprising a non-magnetic substrate and a magnetic layer which is formed on at least one surface of the substrate and comprises acicular particles of ferromagnetic metal oriented perpendicularly to a plane of the layer and an organic polymer filled in spaced between the acicular particles so as to surround the acicular particles, wherein a volume content of the organic polymer is about 5 to 55% by volume of the whole volume of the magnetic layer.

2. The perpendicular magnetic recording medium according to claim 1, wherein the ferromagnetic metal is a cobalt alloy comprising cobalt and at least one metal selected from the group consisting of chromium, vanadium, molybdenum, ruthenium, rhodium, tantalum, rhenium and osmium.

3. The perpendicular magnetic recording medium according to claim 2, wherein the cobalt alloy is one comprising cobalt and chromium.

4. The perpendicular magnetic recording medium according to claim 3, wherein the cobalt alloy contains 10 to 25% by weight of chromium.

5. The perpendicular magnetic recording medium according to claim 1, wherein the organic polymer is cross linked.

6. The perpendicular magnetic recording medium according to claim 1, wherein the ferromagnetic metal comprises iron.

7. The perpendicular magnetic recording medium according to claim 1, wherein the organic polymer is polyethylene, polyethylene terephthalate, polypropylene, polystyrene, polytetrafluoroethylene, polybutadiene, polycarbonate, polyamide, polyimide, polyvinyl chloride, polyvinyl acetate, polyurethane or mixtures thereof.

8. The perpendicular magnetic recording medium according to claim 1, wherein the volume content of the organic polymer is about 23 to 55%.

9. A method for producing a perpendicular recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, which method comprises simultaneously depositing the ferromagnetic metal and the organic polymer on the surface of the substrate to form the magnetic layer, such that a volume content of the organic polymer formed is about 5 to 55% by volume of the whole volume of the magnetic layer.

10. The method according to claim 9, wherein the ferromagnetic metal is a cobalt alloy comprising cobalt and at least one metal selected from the group consisting of chromium, vanadium, molybdenum, ruthenium, rhodium, tantalum, tungsten, rhenium and osmium.

11. The method according to claim 9, wherein the organic polymer is polyethylene, polyethylene terephthalate, polypropylene, polystyrene, polytetrafluoroethylene, polybutadiene, polycarbonate, polyamide, polyimide, polyvinyl chloride, polyvinyl acetate, polyurethane or mixtures thereof.

12. The method according to claim 9, wherein the volume content of the organic polymer is about 23 to 55%.

13. The method according to claim 9, wherein the ferromagnetic metal comprises iron.

14. A method for producing a perpendicular recording medium comprising a non-magnetic substrate and a magnetic layer which is formed on at least one surface of the substrate and comprises acicular particles of ferromagnetic metal oriented perpendicularly to a plane of the layer and an organic polymer filled in spaces between the acicular particles so as to surround the acicular particles, which method comprises depositing the ferromagnetic metal on the surface of the substrate simultaneously with depositing a monomer from which the organic polymer is made on the surface and radiating the monomer with electromagnetic or ionization radiation to polymerize the monomer, such that a volume content of the organic polymer formed is about 5 to 55% by volume of the whole volume of the magnetic layer.

15. The method according to claim 14, wherein the ferromagnetic metal is a cobalt alloy comprising cobalt and at least one metal selected from the group consisting of chromium, vanadium, molybdenum, ruthenium, rhodium, tantalum, tungsten, rhenium and osmium.

16. The method according to claim 14, wherein the organic polymer is polyethylene, polyethylene terephthalate, polypropylene, polystyrene, polytetrafluoroethylene, polybutadiene, polycarbonate, polyamide, polyimide, polyvinyl chloride, polyvinyl acetate, polyurethane or mixtures thereof.

17. The method according to claim 14, wherein the volume content of the organic polymer is about 23 to 55%.

18. The method according to claim 14, wherein the ferromagnetic metal comprises iron.

19. The method according to claim 14, wherein the monomer is deposited on the surface by jetting.

20. A perpendicular magnetic recording medium comprising a non-magnetic substrate having a soft magnetic metal formed on at least one surface of the substrate, in which the soft magnetic metal in turn has a magnetic layer formed thereon, wherein the magnetic layer comprises acicular particles of ferromagnetic metal oriented perpendicularly to a plane of the layer and an organic polymer filled in spaces between the acicular particles so as to surround the acicular particles, wherein a volume content of the organic polymer is about 5 to 55% by volume of the whole volume of the magnetic layer.

21. The perpendicular magnetic recording medium according to claim 20, wherein the soft magnetic metal comprises NiFe.

* * * * *